(12) United States Patent
Usui et al.

(10) Patent No.: US 8,770,353 B2
(45) Date of Patent: Jul. 8, 2014

(54) THRUST GENERATOR AND DISK BRAKE

(75) Inventors: Takuya Usui, Yokohama (JP); Takayasu Sakashita, Tokyo (JP); Atsushi Odaira, Kodaira (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 172 days.

(21) Appl. No.: 13/238,487

(22) Filed: Sep. 21, 2011

(65) Prior Publication Data

US 2012/0080275 A1    Apr. 5, 2012

(30) Foreign Application Priority Data

Sep. 30, 2010  (JP) ................. 222008/2010

(51) Int. Cl.
*F16D 55/22*  (2006.01)
*F16H 25/12*  (2006.01)

(52) U.S. Cl.
USPC ....... 188/72.7; 188/71.4; 188/71.9; 188/72.6; 188/72.8; 188/106 F; 188/156; 188/196 D; 188/196 F; 188/265

(58) Field of Classification Search
CPC ......... F16D 55/00; F16D 55/14; F16D 55/16; F16D 55/22; F16D 55/36; F16D 55/48; F16D 55/226; F16D 55/2262
USPC .......... 188/72.7, 70 R, 72.8, 70 B, 71.8, 71.5, 188/182; 74/89
See application file for complete search history.

(56) References Cited

U.S. PATENT DOCUMENTS

| | | | | |
|---|---|---|---|---|
| 3,638,763 | A | * | 2/1972 | Laverdant .................... 188/72.6 |
| 3,900,084 | A | * | 8/1975 | Farr ........................... 188/196 F |
| 3,991,859 | A | * | 11/1976 | Coulter et al. ............... 188/71.9 |
| 5,487,452 | A | * | 1/1996 | Moinard et al. ............. 188/72.7 |
| 6,422,354 | B1 | * | 7/2002 | Shaw et al. .................. 188/72.8 |
| 2004/0060780 | A1 | * | 4/2004 | Boisseau et al. ............ 188/72.7 |
| 2007/0144838 | A1 | * | 6/2007 | Pozivilko ..................... 188/72.7 |
| 2007/0144861 | A1 | * | 6/2007 | Yamasaki et al. .......... 192/70.23 |

FOREIGN PATENT DOCUMENTS

| | | | | |
|---|---|---|---|---|
| JP | 2002-13568 | | 1/2002 | |
| JP | 2003014015 | A * | 1/2003 | ............. F16D 65/18 |

\* cited by examiner

*Primary Examiner* — Robert A Siconolfi
*Assistant Examiner* — San Aung
(74) *Attorney, Agent, or Firm* — Wenderoth, Lind & Ponack, L.L.P.

(57) ABSTRACT

A ball-and-ramp mechanism of a thrust generator includes a rotary ramp member and a rectilinear ramp member, each having a plurality of sloped grooves sloped along a circumferential direction and having an arcuate diametrical cross-section, and a spherical member interposed between the sloped grooves of the ramp members to transmit force from the rotary ramp member to the rectilinear ramp member. Each of the sloped grooves has regions varying in the curvature radius of the diametrical cross-section in a track area where the spherical member contacts the sloped groove. Accordingly, it is possible to improve the durability of the rotary ramp member and the rectilinear ramp member.

18 Claims, 14 Drawing Sheets

ID TRUST GENERATOR AND DISK BRAKE

BACKGROUND OF THE INVENTION

The present invention relates to a thrust generator and a disk brake using the thrust generator.

There has heretofore been a disk brake for a vehicle that propels a piston to press a brake pad against a disk to apply braking force to the vehicle by using a thrust generator that converts rotational force input thereto from an electric motor or the like into rectilinear motion through a ball-and-ramp mechanism, as disclosed in Japanese Patent Application Publication No. 2002-13568.

The disk brake disclosed in Japanese Patent Application Publication No. 2002-13568 suffers, however, from the following drawback. The ball-and-ramp mechanism has a pair of ramp members with sloped grooves and a spherical member interposed between each pair of mutually opposing sloped grooves. Each sloped groove is formed such that the curvature radius of the diametrical cross-section of the groove is constant along the circumferential direction throughout a track area where the spherical member contacts the sloped groove. Therefore, durability is undesirably degraded in specific regions of the sloped groove.

SUMMARY OF THE INVENTION

The present invention has been made in view of the above-described circumstances. Accordingly, an object of the present invention is to provide a thrust generator improved in the durability of the ramp members of the ball-and-ramp mechanism.

Another object of the present invention is to provide a disk brake (or a stabilizer) using the thrust generator of the present invention.

To solve the above-described problem, the present invention provides a thrust generator having a pressing member generating thrust in an axial direction and a ball-and-ramp mechanism converting rotational force into rectilinear motion to propel the pressing member. The ball-and-ramp mechanism includes a pair of ramp members each having a plurality of sloped grooves sloped along a circumferential direction. Each sloped groove has an arcuate diametrical cross-section. The ball-and-ramp mechanism further includes a spherical member interposed between each pair of mutually opposing sloped grooves of the ramp members to transmit force from one of the pair of ramp members to the other. Each sloped groove has a track area where the spherical member contacts the sloped groove and has regions in the track area that vary in the curvature radius of the diametrical cross-section.

In addition, the present invention provides a thrust generator having a pressing member generating thrust in an axial direction and a ball-and-ramp mechanism converting rotational force into rectilinear motion to propel the pressing member. The ball-and-ramp mechanism includes a pair of ramp members each having a plurality of sloped grooves sloped along a circumferential direction. Each sloped groove has an arcuate diametrical cross-section. The ball-and-ramp mechanism further includes a spherical member interposed between each pair of mutually opposing sloped grooves of the ramp members to transmit force from one of the pair of ramp members to the other. Each sloped groove has a track area where the spherical member contacts the sloped groove and has regions in the track area that vary in the area of contact with the spherical member.

In addition, the present invention provides a disk brake having a pressing member generating thrust in an axial direction to press a brake pad against a disk and a ball-and-ramp mechanism converting rotational force transmitted from a drive source into rectilinear motion to propel the pressing member. The ball-and-ramp mechanism includes a pair of ramp members each having a plurality of sloped grooves sloped along a circumferential direction. Each sloped groove has an arcuate diametrical cross-section. The ball-and-ramp mechanism further includes a rolling member interposed between each pair of mutually opposing sloped grooves of the ramp members to transmit force from one of the pair of ramp members to the other. Each sloped groove has a track area where the spherical member contacts the sloped groove and has regions in the track area that vary in the curvature radius of the diametrical cross-section.

DETAILED DESCRIPTION OF THE INVENTION

Embodiments of the present invention will be explained below in detail with reference to FIGS. 1 to 17.

First, a thrust generator 1a according to a first embodiment of the present invention will be explained in detail with reference to FIGS. 1 to 5.

Figure 1:
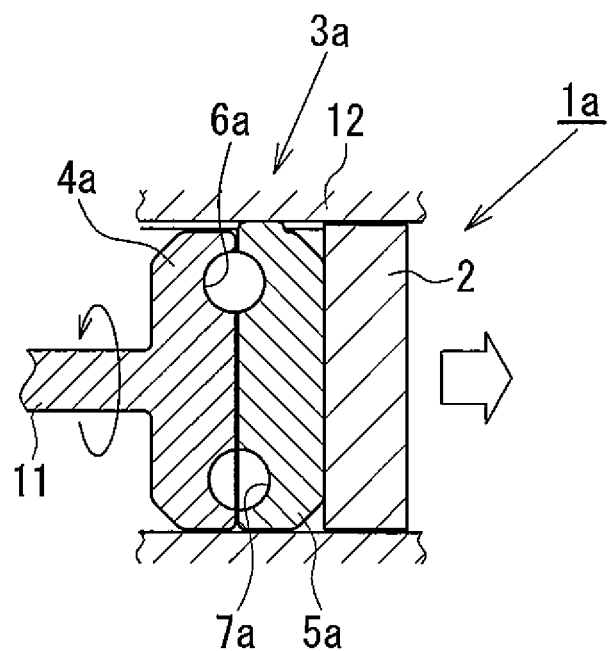
FIG. 1 is a sectional view of a thrust generator according to a first embodiment of the present invention.

The thrust generator 1a according to the first embodiment of the present invention has, as shown in FIG. 1, a pressing member 2 generating thrust in an axial direction and a ball-and-ramp mechanism 3a converting rotational force into rectilinear motion to propel the pressing member 2.

Figure 2:
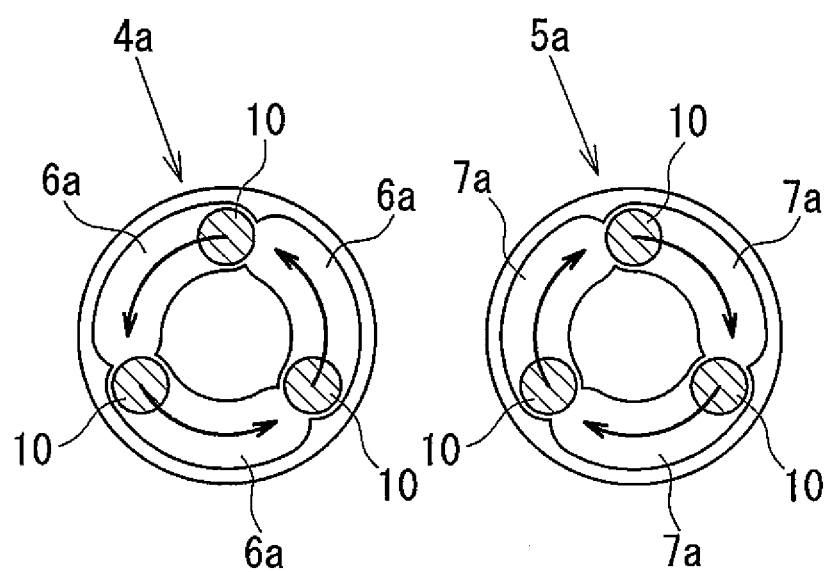
FIG. 2 is a plan view showing sloped grooves of a rotary ramp member and a rectilinear ramp member in FIG. 1 as seen from a middle cross-section between the ramp members.
Figure 3:
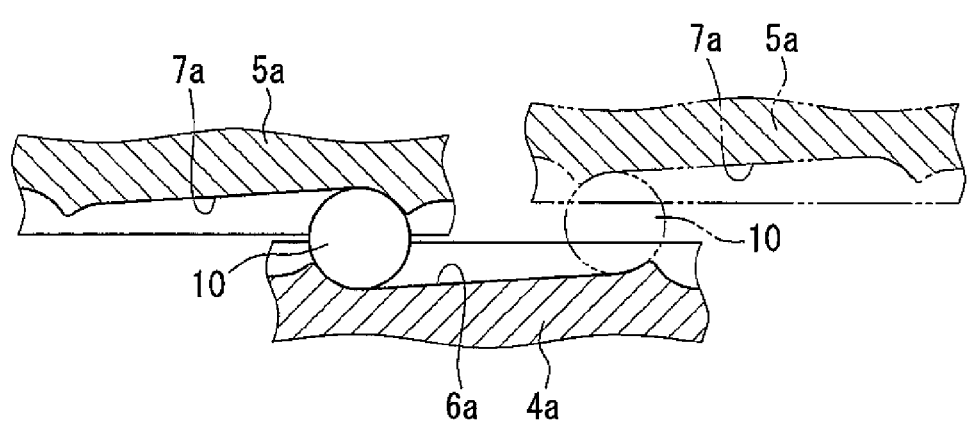
FIG. 3 is a circumferential sectional view of a ball-and-ramp mechanism constituting the thrust generator according to the first embodiment.

As shown in FIGS. 1 to 3, the ball-and-ramp mechanism 3a has a pair of ramp members 4a and 5a, each having a plurality (three in this embodiment) of sloped grooves sloped in a circumferential direction and having an arcuate diametrical cross-section. The ball-and-ramp mechanism 3a further has spherical members 10 (rolling members, or balls) interposed between the sloped grooves 6a and 7a to transmit propulsion force from the rotary ramp member 4a (one ramp member) to the rectilinear ramp member 5a (the other ramp member).

The rotary ramp member 4a has a rotating shaft 11 connected thereto. The rotary ramp member 4a is supported rotatably relative to a housing 12. On the other hand, the rectilinear ramp member 5a is supported movably in the axial direction and non-rotatably relative to the housing 12. When the rotary ramp member 4a is rotated relative to the rectilinear ramp member 5a, the spherical members 10 roll between the sloped grooves 6a and 7a. Consequently, the rectilinear ramp member 5a moves axially (rectilinearly) relative to the rotary ramp member 4a according to the rotational angle of the rotary ramp member 4a. Thus, rotary motion can be converted into rectilinear motion.

Figure 5:
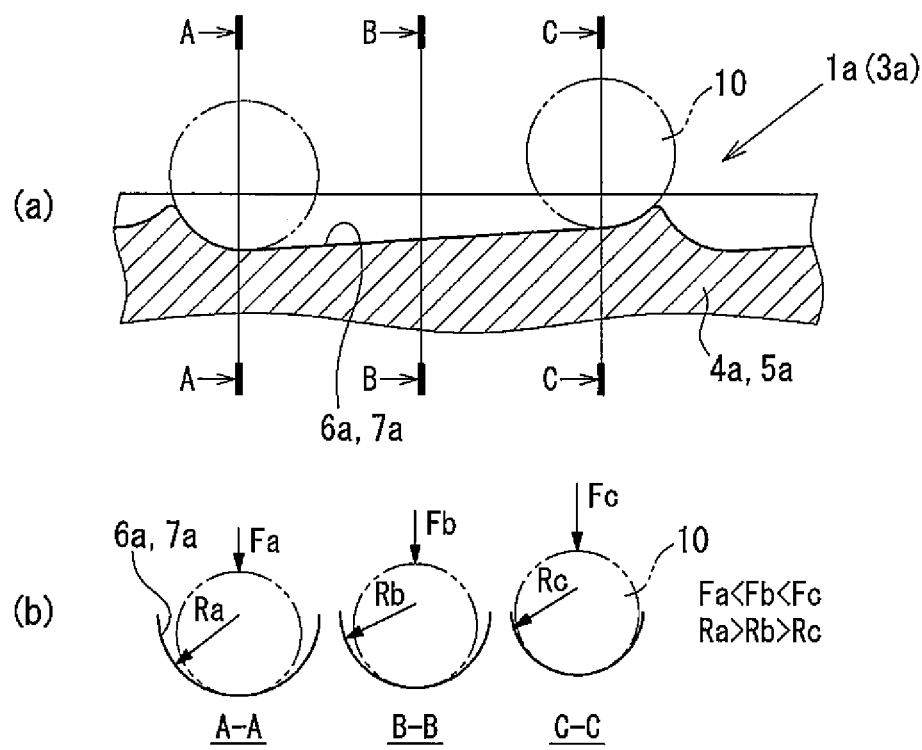
FIG. 5 is a diagram showing the relationship between the curvature radius of each of the sloped grooves of the rotary and rectilinear ramp members and transmitted force in the ball-and-ramp mechanism of the thrust generator according to the first embodiment.

Let us explain in detail the sloped grooves 6a and 7a of the rotary ramp member 4a and the rectilinear ramp member 5a. FIG. 5 shows a sloped groove 6a as a representative of the sloped grooves 6a and 7a. The sloped grooves 7a are configured in the same way as the sloped grooves 6a. Each sloped groove 6a (7a) is sloped along the circumferential direction. The sloped groove 6a (7a) has an arcuate diametrical cross-section. The sloped groove 6a (7a) has a track area where a spherical member 10 rolling therealong contacts the sloped groove 6a (7a). The sloped groove 6a (7a) has different curvature radii Ra, Rb and Rc at a starting end region (region A-A in FIG. 5), intermediate region (region B-B in FIG. 5) and terminating end region (region C-C in FIG. 5) of the track area.

Figure 4:
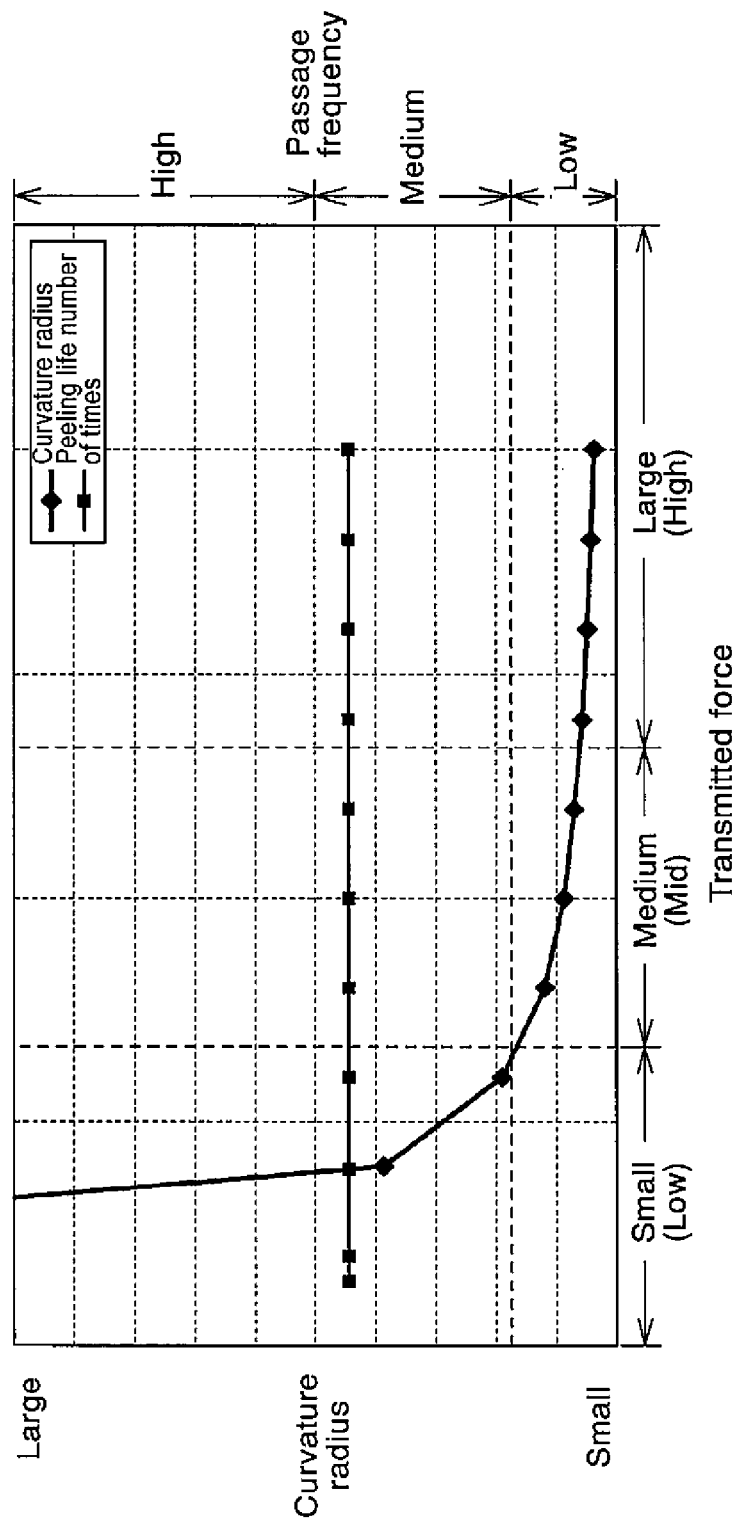
FIG. 4 is a graph showing the correlation between the curvature radius of each sloped groove and passage frequency, on the one hand, and transmitted force, on the other, in the ball-and-ramp mechanism of the thrust generator according to the first embodiment.

More specifically, as shown in FIGS. 4 and 5, the sloped grooves 6a and 7a of the rotary and rectilinear ramp members 4a and 5a are each sloped such that the depth of the groove 6a (7a) becomes shallower along the circumferential direction from the starting end region toward the terminating end region of the track area where the spherical member 10 contacts the sloped groove 6a (7a). Accordingly, propulsion forces Fa, Fb and Fc transmitted from the rotary ramp member 4a to the rectilinear ramp member 5a by the spherical member 10 gradually increase from the starting end region toward the terminating end region of the track area. When the passage frequency at which the spherical member 10 passes is substantially the same over the entire track area of the sloped groove 6a (7a), the curvature radii Ra, Rb and Rc of the sloped groove 6a (7a) are set so as to be the largest in the starting end region of the track area and to gradually decrease from the starting end region toward the terminating end region. That is, in the first embodiment, the curvature radius Ra in the starting end region, the curvature radius Rb in the intermediate region and the curvature radius Rc in the terminating end region are set so that Ra>Rb>Rc. In other words, as shown in part (b) of FIG. 5, the curvature radius Rc of a region (terminating end region) of the sloped groove 6a (7a) where the transmitted force Fc is large is set smaller than the curvature radius Ra of a region (starting end region) of the sloped groove 6a (7a) where the transmitted force Fa is small. More specifically, as shown in FIG. 4, in a region of small transmitted force Fa (region "small" in FIG. 4), the rate of change at which the curvature radius Ra decreases is high. On the other hand, in a range of from a region of medium transmitted force Fb (region "medium" in FIG. 4) to a region of large transmitted force Fc (region "large" in FIG. 4), the rate of change at which the curvature radii Rb and Rc decrease is substantially constant. Thus, the curvature radii Rb and Rc are set remarkably smaller than the curvature radius Ra in the region of small transmitted force Fa. As the curvature radius of the sloped groove 6a (7a) decreases, the contact area with which the spherical member 10 contacts the sloped groove 6a (7a) increases correspondingly.

In this embodiment, the curvature radii Ra, Rb and Rc of the sloped groove 6a (7a) are set so as to gradually decrease from the starting end region toward the terminating end region of the track area, and the propulsion forces Fa, Fb and Fc transmitted from the rotary ramp member 4a to the rectilinear ramp member 5a by the spherical member 10 gradually increase from the starting end region toward the terminating end region of the track area of the sloped groove 6a (7a). Accordingly, the contact surface pressure (Herts stress) can be made substantially constant over the entire range of the sloped groove 6a (7a), from the starting end region to the terminating end region, by setting the curvature radii Ra, Rb and Rc so as to increase the area of contact between the spherical member 10 and the sloped groove 6a (7a) in accordance with the increment of the transmitted propulsion forces Fa, Fb and Fc.

In order to improve the durability of the rotary ramp member 4a and the rectilinear ramp member 5a, peeling life and wear life are demanded to improve. From the viewpoint of the peeling life, if the spherical member 10 presses the sloped groove 6a (7a) with a large load and consequently the contact surface pressure increases, the shear stress in the material of the sloped groove 6a (7a) increases, and peeling occurs from the inside. Therefore, it is necessary to increase the area of contact between the sloped groove 6a (7a) and the spherical member 10 so as to reduce the contact surface pressure to thereby reduce the shear stress in the material, which is a cause of peeling.

From the viewpoint of the wear life, on the other hand, when the spherical member 10 rolls along the arcuate sloped groove 6a (7a), slide occurs between the spherical member 10 and the arcuate sloped groove 6a (7a) due to the difference in circumferential length between the outer and inner peripheral sides of the arcuate sloped groove 6a (7a). The slide causes wear. The slide increases as the rolling speed of the spherical member 10 increases and as the area of contact between the spherical member 10 and the sloped groove 6a (7a) increases. Therefore, it is necessary to reduce the area of contact between the sloped groove 6a (7a) and the spherical member 10.

That is, when the spherical member 10 rolls along the arcuate sloped groove 6a (7a) as in the first embodiment, it is necessary in order to increase the peeling life to increase the area of contact between the sloped groove 6a (7a) and the spherical member 10, and it is necessary in order to increase the wear life to reduce the area of contact between the sloped groove 6a (7a) and the spherical member 10. Thus, the peeling life and the wear life are in a trade-off relation to each other.

Accordingly, in this embodiment, the contact surface pressure between the sloped groove 6a (7a) and the spherical member 10 is made substantially constant over the entire track area, thereby making it possible to improve the wear life generally while ensuring the required peeling life.

The above-mentioned FIG. 4 shows in a single graph the relationship between the service-life number of times concerning the peeling life and the passage frequency (number of times) and the relationship between the curvature radius and the transmitted force (axial force generated by the action of the spherical member 10 on the sloped groove 6a (7a)) for obtaining the peeling life number of times. It is assumed in FIG. 4 that the frequency (number of times) at which the spherical member 10 passes throughout the entire range of from the starting end region to the terminating end region of the sloped groove 6a (7a) is constant. Therefore, the polygonal line representing the peeling life number of times of the sloped groove 6a (7a) is also constant in correspondence to the passage frequency. To make constant the peeling life number of times, the curvature radius should preferably be reduced according to the magnitude of the transmitted force, as shown by the polygonal line representing the curvature radius, so that the contact surface pressure becomes substantially constant. It should be noted that, in each embodiment explained in the specification of this application, the peeling life number of times is determined in correspondence to the passage frequency; in this sense, the passage frequency and the peeling life number of times show the same tendency, and these are treated as synonyms for the sake of explanation.

The smaller the curvature radius of the arcuate sloped groove 6a (7a), the larger the difference between the inner and outer circumferential lengths of the sloped groove 6a (7a), and the more likely it becomes that wear will occur. Therefore, a special emphasis may be placed on the wear life when the curvature radius of the arcuate sloped groove 6a (7a) is small, for example. That is, the rate at which the curvature radii Ra, Rb and Rc of the sloped groove 6a (7a) gradually decrease from the starting end region toward the terminating end region of the track area is set gentler than in the foregoing embodiment. Consequently, the contact surface pressure gradually increases. In this case, however, the rate at which the curvature radii Ra, Rb and Rc of the sloped groove 6a (7a) decrease can also be set gentler. Accordingly, the wear life can be improved even more generally while taking the peeling life into account.

As has been stated above, in this embodiment, the balance between the peeling life and the wear life can be adjusted easily by appropriately setting the curvature radii Ra, Rb and Rc of the sloped groove 6a (7a).

Next, a thrust generator 1b according to a second embodiment of the present invention will be explained with reference to FIGS. 6 to 9. In this embodiment, the thrust generator 1b is employed in a motor-driven disk brake 15 that applies braking force to a vehicle.

Figure 6:
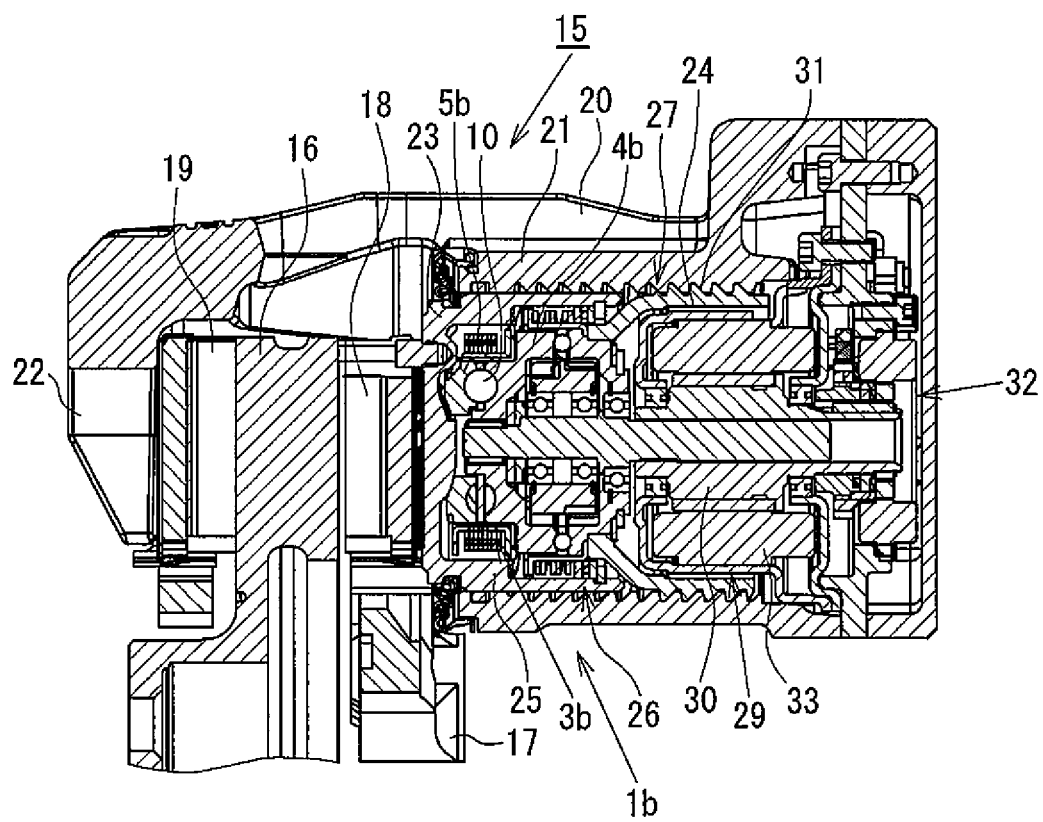
FIG. 6 is a sectional view of a motor-driven disk brake employing a thrust generator according to a second embodiment of the present invention.

As shown in FIG. 6, the motor-driven disk brake 15 has the thrust generator 1b according to the second embodiment and is structured as a floating caliper type disk brake. The motor-driven disk brake 15 has a disk rotor 16 rotating together with a wheel, a carrier 17 secured to a non-rotating part (not shown), e.g. a suspension member, provided on a vehicle body, a pair of brake pads 18 and 19 disposed at the opposite sides, respectively, of the disk rotor 16 and supported by the carrier 17, and a caliper body 20 disposed to extend over the outer periphery of the disk rotor 16 and supported by the carrier 17 movably along the axial direction of the disk rotor 16.

The caliper body 20 has an integral structure including a circular cylindrical cylinder portion 21 having a through-hole that opens facing one side of the disk rotor 16 and a claw portion 22 extending over the outer periphery of the disk rotor 16 from the cylinder portion 21 to the other side of the disk rotor 16. The cylinder portion 21 of the caliper body 20 is provided therein with a piston unit 23 and a motor unit 24.

The piston unit 23 has an integral structure including a piston 25, a ball-and-ramp mechanism 3b, a differential speed reducing mechanism 26, and a pad wear compensating mechanism 27. The piston 25 is in the shape of a circular cylinder, one end of which is closed. The piston 25 is slidably fitted in the cylinder portion 21 to function as a pressing member of the thrust generator 1b. The ball-and-ramp mechanism 3b is accommodated in the piston 25 to convert rotational force into rectilinear motion to propel the piston 25. The differential speed reducing mechanism 26 and the pad wear compensating mechanism 27 are accommodated in the piston 25.

Figure 7:
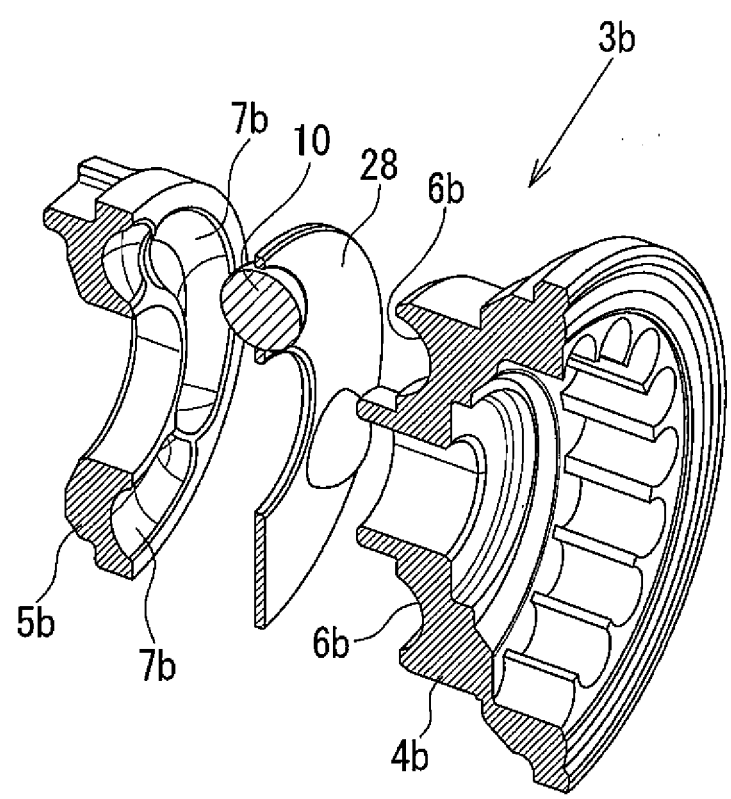
FIG. 7 is a perspective view of a ball-and-ramp mechanism employed in the thrust generator according to the second embodiment.

The ball-and-ramp mechanism 3b of the thrust generator 1b has, as shown in FIGS. 6 and 7, a rotary ramp member 4b (one ramp member) movable in the rotational direction, a rectilinear ramp member 5b secured to the bottom of the piston 25 and movable in the axial direction together with the piston 25, and spherical members 10 interposed between sloped grooves 6b and 7b formed on the mutually opposing surfaces of the rotary and rectilinear ramp members 4b and 5b. It should be noted that each spherical member 10 is retained by a retainer 28.

When the rotary ramp member 4b is rotated relative to the rectilinear ramp member 5b, the spherical members 10 roll between the sloped grooves 6b and 7b, which causes the rectilinear ramp member 5b to move axially relative to the rotary ramp member 4b according to the angle of rotation of the rotary ramp member 4b. Thus, rotary motion can be converted into rectilinear motion.

Figure 8:
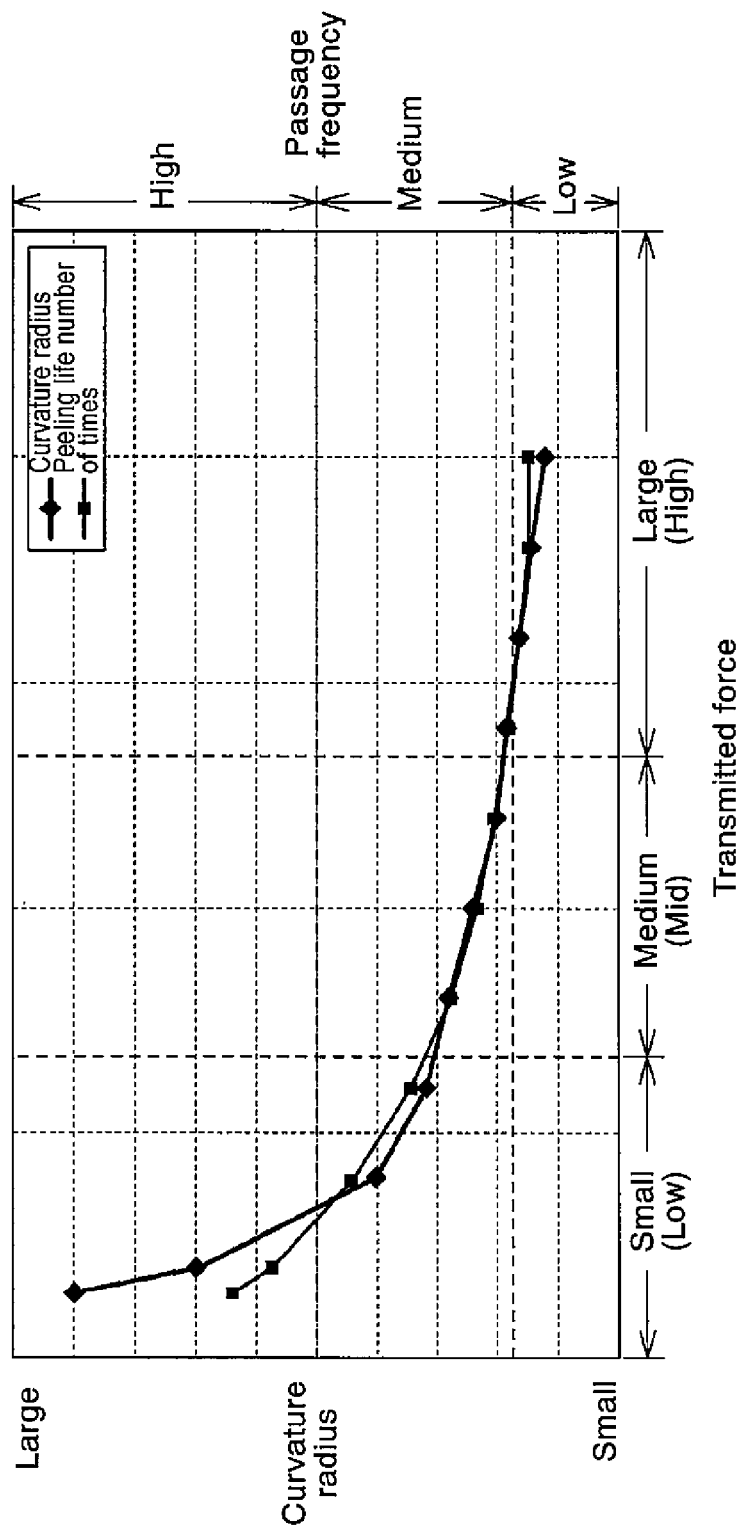
FIG. 8 is a graph showing the correlation between the curvature radius of each sloped groove and passage frequency, on the one hand, and transmitted force, on the other, in the ball-and-ramp mechanism of the thrust generator according to the second embodiment.
Figure 9:
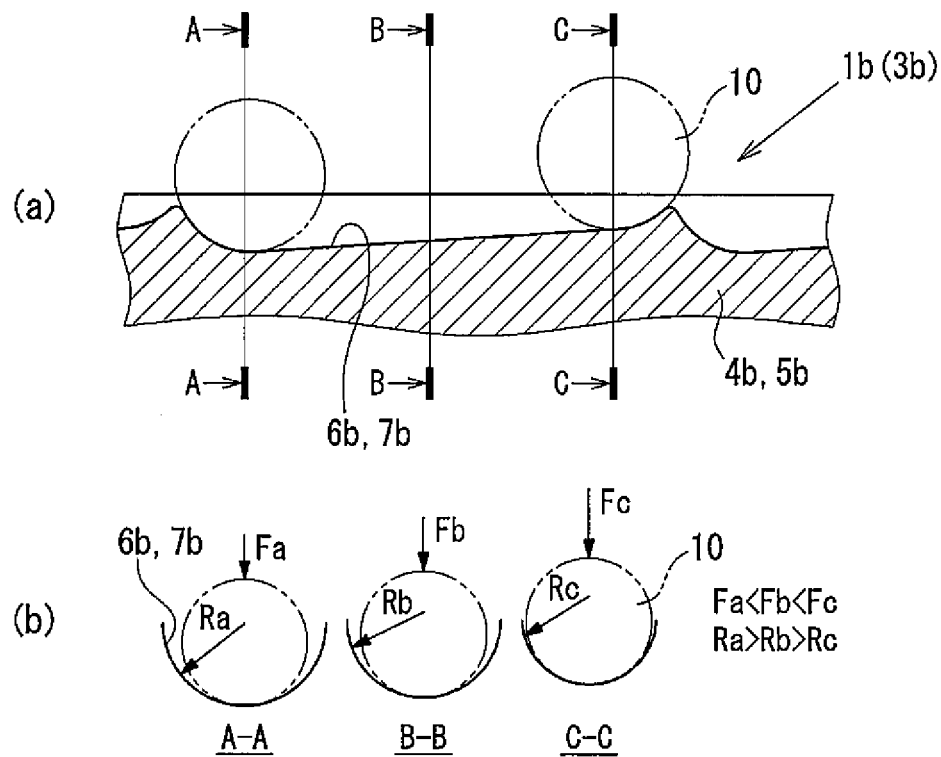
FIG. 9 is a diagram showing the relationship between the curvature radius of each of sloped grooves of rotary and rectilinear ramp members and transmitted force in the ball-and-ramp mechanism of the thrust generator according to the second embodiment.

The sloped grooves 6b and 7b of the rotary and rectilinear ramp members 4b and 5b will be explained in more detail. FIGS. 8 and 9 show contents and relationships similar to those in FIGS. 4 and 5 of the first embodiment. Each sloped groove 6b (7b) is sloped along the circumferential direction. The sloped groove 6b (7b) has an arcuate diametrical cross-section and has different curvature radii at a starting end region, intermediate region and terminating end region of a track area where a spherical member 10 rolling therealong contacts the sloped groove 6b (7b).

More specifically, as shown in FIGS. 8 and 9, the sloped grooves 6b and 7b of the rotary and rectilinear ramp members 4b and 5b are each sloped such that the depth of the groove 6b (7b) becomes shallower along the circumferential direction from the starting end region toward the terminating end region of the track area where the spherical member 10 contacts the sloped groove 6b (7b). Accordingly, propulsion forces Fa, Fb and Fc transmitted from the rotary ramp member 4b to the rectilinear ramp member 5b by the spherical member 10 gradually increase from the starting end region toward the terminating end region of the track area. It is assumed that the passage frequency at which the spherical member 10 passes is high in the starting end region of the sloped groove 6b (7b), which is an ordinary brake region, and that the passage frequency gradually decreases toward the terminating end region of the sloped groove 6b (7b), which is a sudden braking region. Accordingly, the peeling life number of times in FIG. 8 is set to gradually decrease in the form of a downward convex curve from a region of small transmitted force Fa (region "small" in FIG. 8) to a region of large transmitted force Fc (region "large" in FIG. 8) in conformity to the passage frequency. To obtain such a peeling life number of times, the polygonal line representing the curvature radii Ra, Rb and Rc of the sloped groove 6b (7b) is set such that the curvature radius is the largest in the starting end region (region of small transmitted force Fa) and gradually decreases from the starting end region toward the terminating end region (region of large transmitted force Fc) at a rate of change similar to the rate at which the passage frequency decreases and that the curvature radius is the smallest in the terminating end region.

Because the curvature radius Ra is the largest in the starting end region of the track area, the area of contact between the sloped groove 6b (7b) and the spherical member 10 reduces and the contact surface pressure increases in the starting end region, resulting in an increase of the internal shear stress, which is a cause of peeling. However, the region where the contact surface pressure increases has a low passage frequency. Therefore, the peeling life number of times will not be exceeded during the term of the guarantee on the product.

The polygonal line representing the curvature radius in FIG. 8 may be compared with the above-described polygonal line in FIG. 4 as follows. In the starting end region (region of small transmitted force Fa) of the track area of the sloped groove 6b (7b), the required peeling life number of times is larger in FIG. 8 than in FIG. 4. Therefore, the curvature radius polygonal line shows a relatively small curvature radius to reduce the contact surface pressure. However, in a range of from the intermediate region (region of medium transmitted force Fb) to the terminating end region (region of large transmitted force Fc), the required peeling life number of times is smaller in FIG. 8 than in FIG. 4. Therefore, the curvature radius polygonal line shows a relatively large curvature radius to increase the contact surface pressure to some extent corresponding to the peeling life, thereby lengthening the wear life, which is in a trade-off relation to the peeling life.

In the second embodiment, in the starting end region (region of small transmitted force Fa) of the track area where the spherical member 10 contacts the sloped groove 6b (7b), the passage frequency is high, but the transmitted force Fa is small. Therefore, the curvature radius Ra of the sloped groove 6b (7b) is set large so that the area of contact between the sloped groove 6b (7b) and the spherical member 10 reduces, by taking the wear life into account while meeting the requirements for peeling life. On the other hand, in the terminating end region (region of large transmitted force Fc) of the track area, the passage frequency is low, but the transmitted force is large. Therefore, a special emphasis is placed on the peeling life. That is, the curvature radius Rc of the sloped groove 6b (7b) is set small to increase the area of contact between the sloped groove 6b (7b) and the spherical member 10 so that the contact surface pressure reduces.

In other words, when the passage frequency of the spherical member 10 in the medium transmitted force Fb region is in the neighborhood of a logarithmic median between the small transmitted force Fa region and the large transmitted force Fc region, each of the sloped grooves 6b and 7b of the rotary and rectilinear ramp members 4b and 5b is formed so that the curvature radius Rc of the diametrical cross-section of the large transmitted force Fc region is smaller than the curvature radius Ra of the diametrical cross-section of the small transmitted force Fa region.

With this structure, it is possible to ensure the peeling life of the rotary and rectilinear ramp members 4b and 5b of the ball-and-ramp mechanism 3b and, at the same time, the wear life can be improved.

As shown in FIG. 6, the differential speed reducing mechanism 26 is interposed between the ball-and-ramp mechanism 3b and an electric motor 29 of the motor unit 24 to transmit the rotation of a rotor 30 of the electric motor 29 to the rotary ramp member 4b of the ball-and-ramp mechanism 3b after reducing the speed of the rotation at a predetermined speed reduction ratio. The pad wear compensating mechanism 27 advances an adjusting screw 31 according to the degree of wear of the brake pads 18 and 19 (i.e. according to a change in the position of contact with the disk rotor 16), thereby allowing the ball-and-ramp mechanism 3b to follow up the wear of the brake pads 18 and 19.

As shown in FIG. 6, the motor unit 24 has an electric motor 29 and a resolver 32 incorporated therein. By supplying an electric current to the coil of a stator 33 of the electric motor 29, the rotor 30 is rotated to drive the ball-and-ramp mechanism 3b through the differential speed reducing mechanism 26. At this time, the position of rotation of the rotor 30 is detected by the resolver 32.

The following is an explanation of the operation of the motor-driven disk brake 15 shown in FIG. 6. During braking, the electric motor 29 is supplied with a control electric current from a controller (not shown) in accordance with a driver's braking operation, e.g. an operation of a brake pedal provided in the vehicle, or an operation of a parking brake operating member provided in the vehicle, thereby rotating the rotor 30 in a direction for braking.

Next, the rotation of the rotor 30 is reduced in speed at a predetermined speed reduction ratio by the differential speed reducing mechanism 26 to increase the rotational force of the electric motor 29 before being transmitted to the ball-and-ramp mechanism 3b. The transmitted rotational force is converted into rectilinear motion by the ball-and-ramp mechanism 3b to propel the piston 25.

Next, the propulsion of the piston 25 causes one brake pad 18 to be pressed against the disk rotor 16, and counterforce produced at this time moves the caliper body 20. Consequently, the claw portion 22 causes the other brake pad 19 to be pressed against the disk rotor 16, thereby generating braking force.

It should be noted that the wear of the brake pads 18 and 19 is compensated for by advancing the adjusting screw 31 of the pad wear compensating mechanism 27 to allow the ball-and-ramp mechanism 3b to follow up the wear of the brake pads 18 and 19.

As has been stated above, in the motor-driven disk brake 15 employing the thrust generator 1b according to the second embodiment, the passage frequency at which the spherical member 10 passes the sloped grooves 6b and 7b of the rotary and rectilinear ramp members 4b and 5b of the ball-and-ramp mechanism 3b changes so as to gradually decrease in the form of a downward convex curve as shown by the polygonal line representing the peeling life number of times in FIG. 8 over the range of from the starting end region (small transmitted force Fa region) to the terminating end region (large transmitted force Fc region) of the sloped groove 6b (7b).

Therefore, the curvature radii Ra, Rb and Rc of the sloped groove 6b (7b) (having an arcuate diametrical cross-section) are set so as to correspond to the polygonal line representing the peeling life number of times, i.e. so that the curvature radius of the sloped groove 6b (7b) is the largest in the starting end region (small transmitted force Fa region) of the track area and gradually decreases from the starting end region toward the terminating end region at a rate of change similar to the rate at which the passage frequency decreases and that the curvature radius is the smallest in the terminating end region (large transmitted force Fc region; see the polygonal line representing the curvature radius in FIG. 8).

With the above-described structure, it is possible to properly meet the requirements for peeling life and wear life of the rotary and rectilinear ramp members 4b and 5b of the ball-and-ramp mechanism 3b.

Although in the foregoing embodiment the thrust generator 1b according to the second embodiment is employed in the motor-driven disk brake 15, the thrust generator 1b may also be employed in a disk brake equipped with a motor-driven parking brake mechanism or in a disk brake with a hand-operated parking brake mechanism. When the thrust generator 1b is employed in a disk brake equipped with a hand-operated parking brake mechanism, a parking lever or a parking pedal provided in the vehicle as a parking brake operating member is operated by the driver, and the force with which the parking lever or pedal is operated is transmitted as rotational force to the rotary ramp member of the ball-and-ramp mechanism.

Next, a thrust generator 1c according to a third embodiment of the present invention will be explained in detail with reference to FIGS. 10 and 11.

It should be noted that only the points in which the thrust generator 1c of the third embodiment differs from the thrust generator 1a of the first embodiment will be explained below.

In the thrust generator 1c of the third embodiment, sloped grooves 6c and 7c of rotary and rectilinear ramp members 4c and 5c of a ball-and-ramp mechanism 3c have an arcuate diametrical cross-section. As shown in FIGS. 10 and 11, which are similar to FIGS. 4 and 5 of the first embodiment, the sloped grooves 6c and 7c of the rotary and rectilinear ramp members 4c and 5c are each sloped such that the depth of the groove 6c (7c) becomes shallower along the circumferential direction from the starting end region toward the terminating end region of the track area where the spherical member 10 contacts the sloped groove 6c (7c). Accordingly, propulsion forces Fa, Fb and Fc transmitted from the rotary ramp member 4c to the rectilinear ramp member 5c by the spherical member 10 gradually increase from the starting end region toward the terminating end region of the track area.

Figure 10:
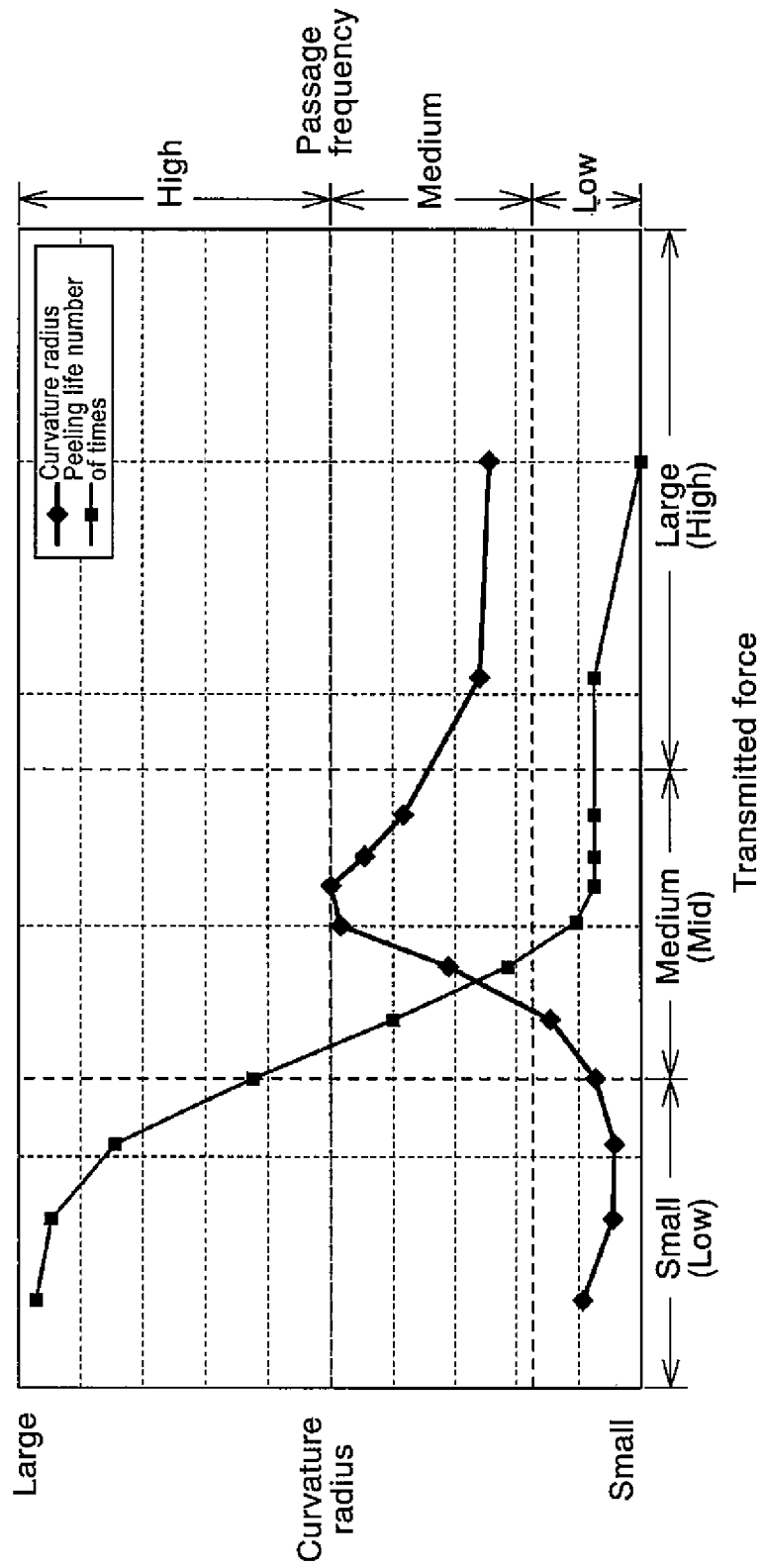
FIG. 10 is a graph showing the correlation between the curvature radius of each sloped groove and passage frequency, on the one hand, and transmitted force, on the other, in a ball-and-ramp mechanism of a thrust generator according to a third embodiment of the present invention.
Figure 11:
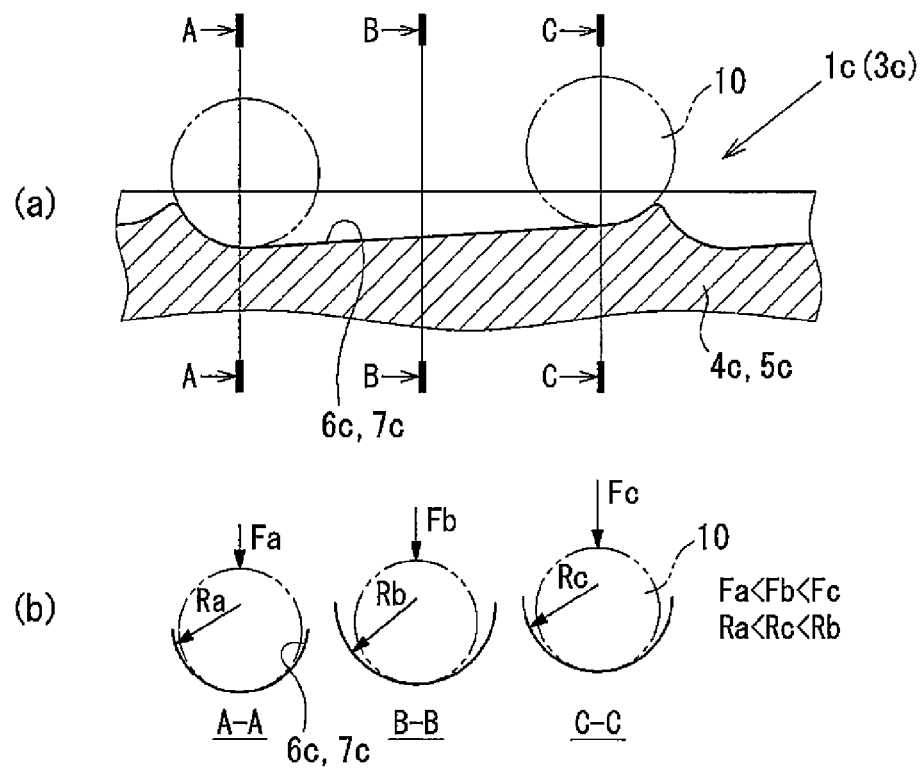
FIG. 11 is a diagram showing the relationship between the curvature radius of each of sloped grooves of rotary and rectilinear ramp members and transmitted force in the ball-and-ramp mechanism of the thrust generator according to the third embodiment.

Further, the thrust generator 1c of the third embodiment is assumed to be used under the conditions that the passage frequency at which the spherical member 10 passes changes as shown by the polygonal line representing the peeling life number of times in FIG. 10. That is, the passage frequency is fairly high in the small transmitted force Fa region (region "small" in FIG. 10) and sharply decreases (i.e. at a high rate of reduction) from the small transmitted force Fa region to a substantially middle position of the medium transmitted force Fb region (region "medium" in FIG. 10). The passage frequency decreases more gently (i.e. at a lower rate of reduction) than at the previous stage from the substantially middle position of the medium transmitted force Fb region to the large transmitted force Fc region (region "large" in FIG. 10).

Accordingly, the curvature radii Ra, Rb and Rc of the sloped groove 6c (7c) are set as follows. As will be understood from FIGS. 10 and 11, in the starting end region (small transmitted force Fa region; region "small" in FIG. 10) of the track area, the curvature radius Ra (mean value in the region concerned) of the sloped groove 6c (7c) is set small so as to increase the area of contact between the sloped groove 6c (7c) and the spherical member 10 in view of the relationship between the transmitted force and the passage frequency (peeling life number of times).

In this region (region "small" in FIG. 10), the polygonal line representing the curvature radius in FIG. 10 changes in the form of a downward convex curve. On the other hand, in the intermediate region (medium transmitted force Fb region; region "medium" in FIG. 10) of the track area, the curvature radius Rb (mean value in the region concerned) of the sloped groove 6c (7c) is set large so as to reduce the area of contact between the sloped groove 6c (7c) and the spherical member 10 in view of the relationship between the transmitted force and the passage frequency (peeling life number of times). In this region (region "medium" in FIG. 10), the polygonal line representing the curvature radius in FIG. 10 reaches a maximum at a substantially middle position of the region "medium" in FIG. 10 and changes in the form of an upward convex curve. In other words, in the first half of this region (region "medium" in FIG. 10), the size of the curvature radius Rb changes in inverse proportion to the passage frequency. In the terminating end region (large transmitted force Fc region; region "large" in FIG. 10) of the track area, the curvature radius Rc of the sloped groove 6c (7c) is set at a value between the curvature radius Ra (mean value) in the starting end region (region "small" in FIG. 10) and the curvature radius Rb (mean value) in the intermediate region (region "medium" in FIG. 10) in view of the relationship between the transmitted force and the passage frequency. In this region (region "large" in FIG. 10), the polygonal line representing the curvature radius in FIG. 10 is set substantially constant.

With the above-described structure, it is possible to properly meet the requirements for both peeling life and wear life of the rotary and rectilinear ramp members 4c and 5c of the ball-and-ramp mechanism 3c.

Figure 12:
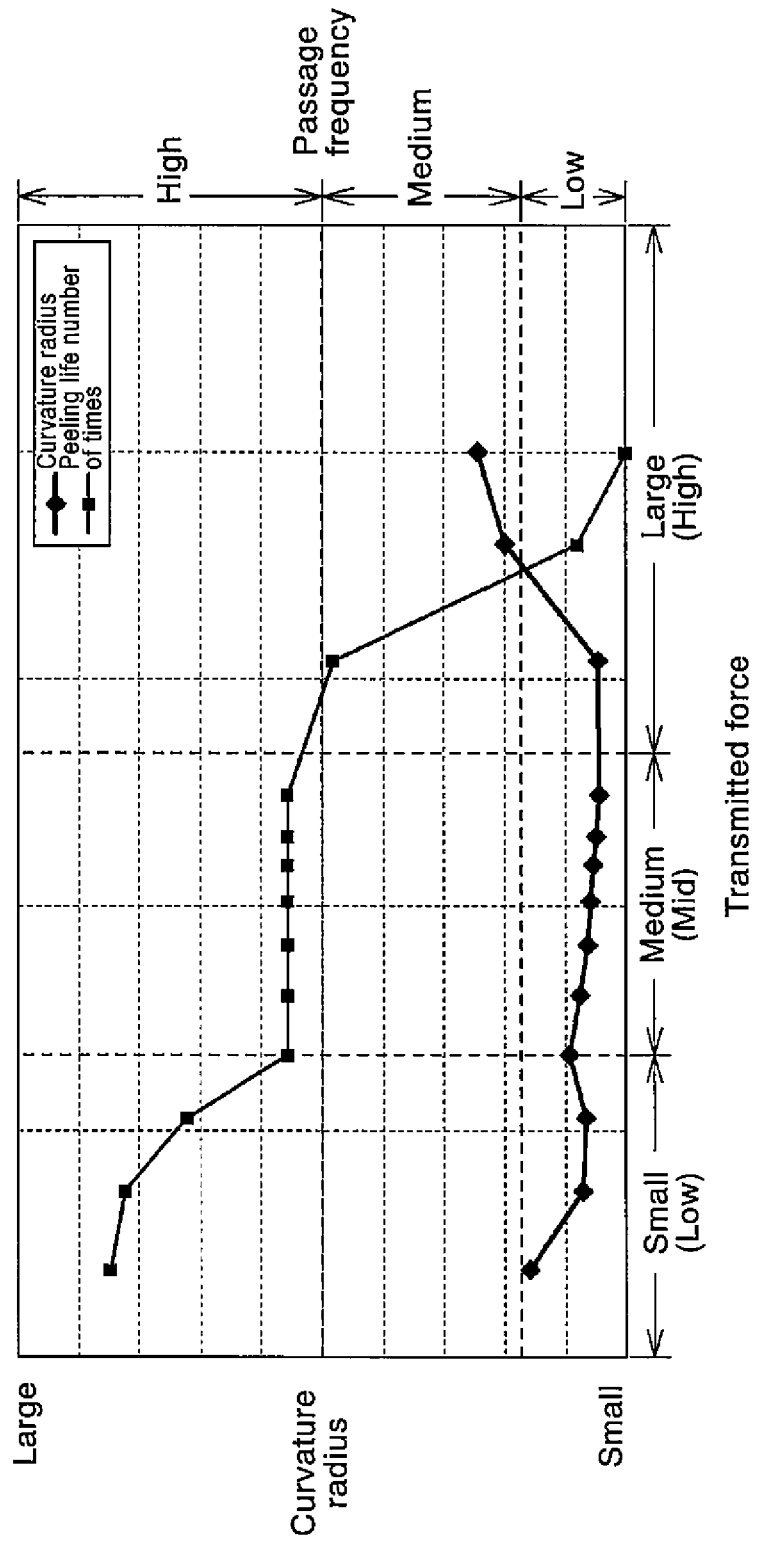
FIG. 12 is a graph showing the correlation between the curvature radius of each sloped groove and passage frequency, on the one hand, and transmitted force, on the other, in a ball-and-ramp mechanism of a thrust generator according to a fourth embodiment.
Figure 13:
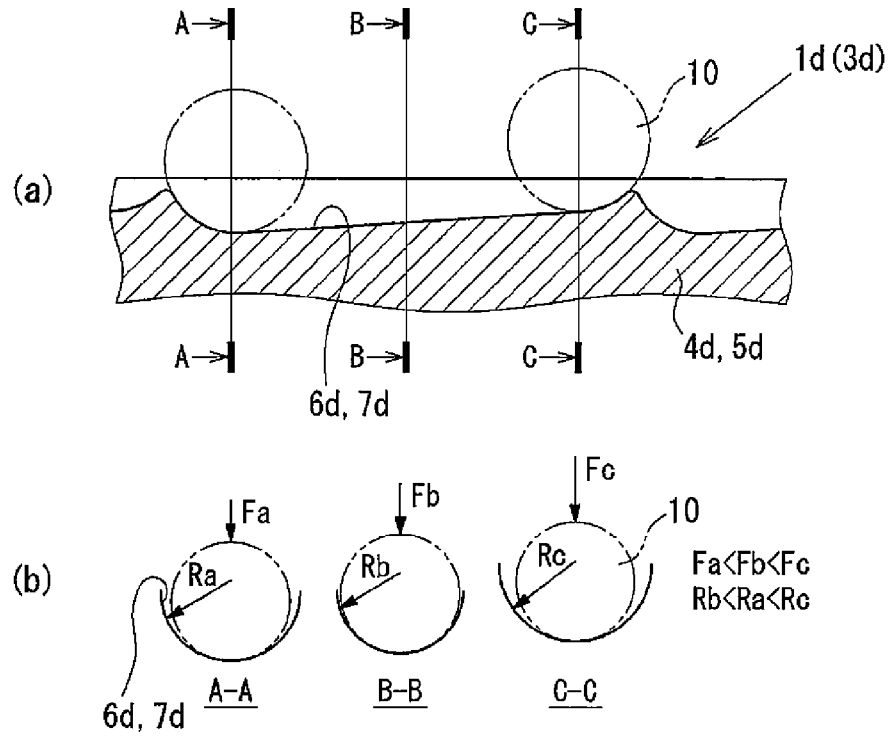
FIG. 13 is a diagram showing the relationship between the curvature radius of each of sloped grooves of rotary and rectilinear ramp members and transmitted force in the ball-and-ramp mechanism of the thrust generator according to the fourth embodiment.

Next, a thrust generator 1d according to a fourth embodiment of the present invention will be explained in detail with reference to FIGS. 12 and 13.

It should be noted that only the points in which the thrust generator 1d of the fourth embodiment differs from the thrust generator 1a of the first embodiment will be explained below.

In the thrust generator 1d of the fourth embodiment, sloped grooves 6d and 7d of rotary and rectilinear ramp members 4d and 5d of a ball-and-ramp mechanism 3d have an arcuate diametrical cross-section. As shown in FIGS. 12 and 13 similar to FIGS. 4 and 5 of the first embodiment, propulsion forces Fa, Fb and Fc transmitted from the rotary ramp member 4d to the rectilinear ramp member 5d by the spherical member 10 gradually increase from the starting end region toward the terminating end region of the track area where the spherical member 10 contacts the sloped groove 6c (7c). Further, in the fourth embodiment, the passage frequency at which the spherical member 10 passes changes as shown by the polygonal line representing the peeling life number of times in FIG. 12. That is, the passage frequency is fairly high in the small transmitted force Fa region (region "small" in FIG. 12) and gradually decreases in the form of an upward convex curve. In the medium transmitted force Fb region (region "medium" in FIG. 12), the passage frequency remains substantially constant at a relatively large number of times of passage. In the large transmitted force Fc region (region "large" in FIG. 12), the passage frequency changes so as to decrease again.

Accordingly, the curvature radii Ra, Rb and Rc of the sloped groove 6d (7d) are set as follows. As will be understood from FIGS. 12 and 13, in the intermediate region (medium transmitted force Fb region; region "medium" in FIG. 12) of the track area, the curvature radius Rb is set small so as to increase the area of contact between the sloped groove 6d (7d) and the spherical member 10 in view of the relationship between the transmitted force and the passage frequency. In this region (region "medium" in FIG. 12), the polygonal line representing the curvature radius in FIG. 12 is set substantially constant.

On the other hand, in the terminating end region (large transmitted force Fc region; region "large" in FIG. 12) of the track area, the curvature radius Rc (mean value in the region concerned) of the sloped groove 6d (7d) is set large so as to reduce the area of contact between the sloped groove 6d (7d) and the spherical member 10, with the wear life taken into account while meeting the requirements for peeling life, in view of the relationship between the transmitted force and the passage frequency. In this region (region "large" in FIG. 12), the polygonal line representing the curvature radius in FIG. 12 is set so that the curvature radius Rc increases as the transmitted force increases. In the starting end region (small transmitted force Fa region; region "small" in FIG. 12) of the track area, the curvature radius Ra (mean value in the region concerned) of the sloped groove 6d (7d) is set substantially similar to the curvature radius Rb in the intermediate region in view of the relationship between the transmitted force and the passage frequency. In this region (region "small" in FIG. 12), the polygonal line representing the curvature radius in FIG. 12 changes in the form of a downward convex curve.

In other words, when the passage frequency of the spherical member 10 in the medium transmitted force Fb region is closer to the passage frequency in the small transmitted force Fa region than a logarithmic median between the passage frequency in the small transmitted force Fa region and the passage frequency in the large transmitted force Fc region, each of the sloped grooves 6b and 7b of the rotary and rectilinear ramp members 4b and 5b is formed so that the curvature radius Rc of the diametrical cross-section of the large transmitted force Fc region is larger than the curvature radius Rb of the diametrical cross-section of the medium transmitted force Fb region and the curvature radius Ra of the diametrical cross-section of the small transmitted force Fa region.

With this structure, it is possible to meet the requirements for both peeling life and wear life of the rotary and rectilinear ramp members 4b and 5b of the ball-and-ramp mechanism 3b.

Figure 14:
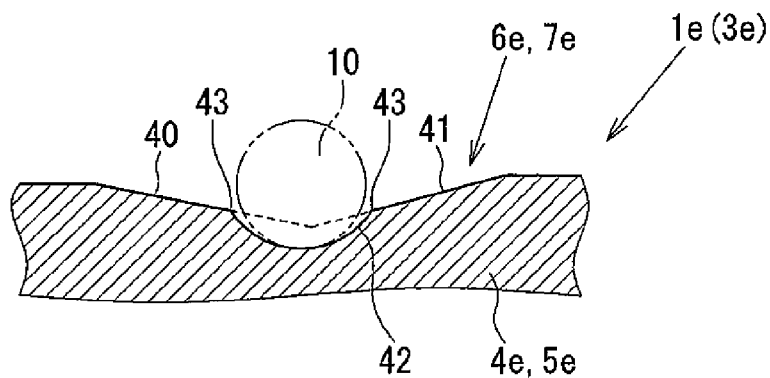
FIG. 14 is a circumferential sectional view of each of sloped grooves of rotary and rectilinear ramp members in a ball-and-ramp mechanism of a thrust generator according to a fifth embodiment of the present invention.
Figure 15:
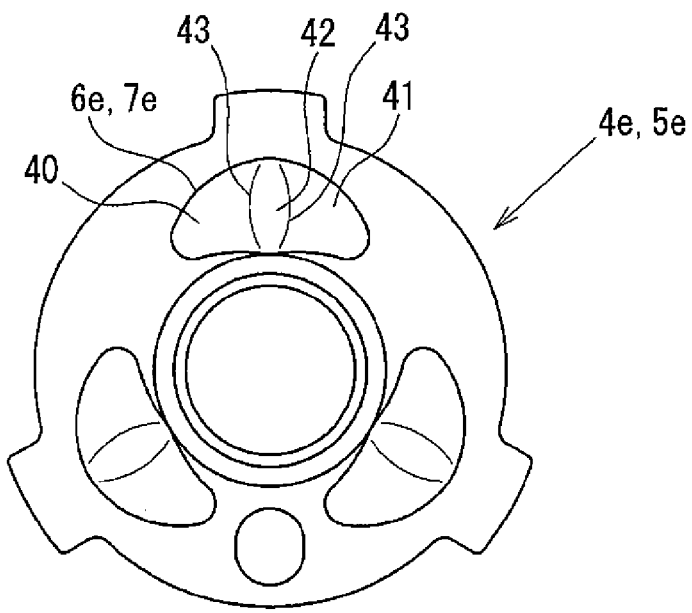
FIG. 15 is a plan view of the rotary and rectilinear ramp members in the ball-and-ramp mechanism of the thrust generator according to the fifth embodiment.

Next, a thrust generator 1e according to a fifth embodiment of the present invention will be explained in detail with reference to FIGS. 14 and 15. It should be noted that only the points in which the thrust generator 1e of the fifth embodiment differs from the thrust generator 1a of the first embodiment will be explained below.

In the thrust generator 1e of the fifth embodiment, sloped grooves 6e and 7e of rotary ramp members 4e and 5e of a ball-and-ramp mechanism 3e each comprise a central concave groove portion 42, a first sloped surface 40 upwardly sloped in the leftward direction (as viewed in FIG. 15) from the concave groove portion 42, and a second sloped surface 41 upwardly sloped in the rightward direction (as viewed in FIG. 15) from the concave groove portion 42 at the same slope angle as the first sloped surface 40. Inflection points 43 (portion at which the slope angle changes) are formed at respective boundaries of the first and second sloped surfaces 40 and 41 with the concave groove portion 42. In addition, each sloped groove 6e (7e) has an arcuate diametrical cross-section over the entire track area. The arcuate diametrical cross-sections of the inflection points 43 of the first and second sloped surfaces 40 and 41 and their vicinities have a curvature radius smaller than the curvature radii of the other parts of the sloped groove 6e (7e).

In this regard, the related art structure suffers from a large contact stress at the inflection points of the sloped grooves 6e and 7e, at which the slope angle changes, and has a fear that the peeling life may be degraded. According to this embodiment, the arcuate diametrical cross-sections of the inflection points 43 of the first and second sloped surfaces 40 and 41 and their vicinities have a curvature radius smaller than the curvature radii of the other parts of the sloped groove 6e (7e). Consequently, the area of contact with the spherical member 10 increases, and the contact surface pressure is reduced, which makes it possible to improve the peeling life.

Figure 16:
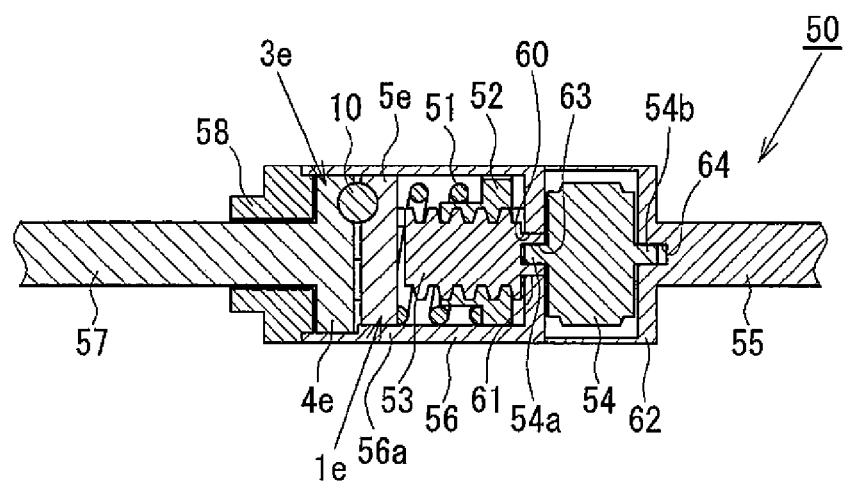
FIG. 16 is a sectional view of a stabilizer employing the thrust generator according to the fifth embodiment.
Figure 17:
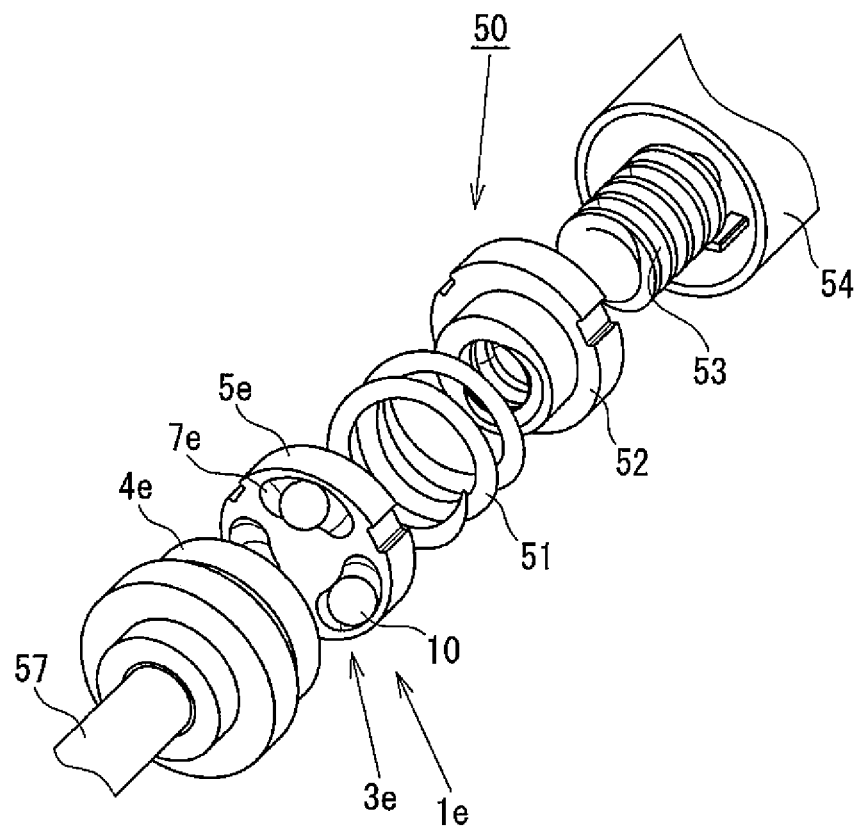
FIG. 17 is a perspective view of the stabilizer shown in FIG. 16.

A stabilizer 50 employing the thrust generator 1e according to the above-described fifth embodiment will be explained in detail with reference to FIGS. 16 and 17. The stabilizer 50 has a compression spring 51 which is a torsion bar serving as a pressing member, a cylindrical member 52 abutted by the compression spring 51 and having an internal thread on the inner periphery thereof, a columnar member 53 having an external thread on the outer periphery thereof that is engaged with the cylindrical member 52, a ball-and-ramp mechanism 3e converting rotational force into rectilinear motion to press the compression spring 51, and an electric motor 54 connected to the columnar member 53 to rotate it.

The compression spring 51, the cylindrical member 52, the columnar member 53 and the ball-and-ramp mechanism 3e are accommodated in a housing 56, one end of which is open. The open end of the housing 56 is closed with a rod guide 58 rotatably supporting a second shaft member 57 integrally connected to a rotary ramp member 4e of the ball-and-ramp mechanism 3e. The rotary ramp member 4e is supported rotatably relative to the housing 56. On the other hand, a rectilinear ramp member 5e of the ball-and-ramp mechanism 3e is supported axially movably but non-rotatably by being fitted with anti-rotation detent projections 56a (only one of them is shown in FIG. 16) projecting from two to four positions on the inner periphery of the housing 56 and extending axially. Similarly, the cylindrical member 52 is supported axially movably but non-rotatably by being fitted with the detent projections 56a of the housing 56. The compression spring 51 is disposed between the rectilinear ramp member 5e and the cylindrical member 52 to press the rectilinear ramp member 5e against the rotary ramp member 4e. An opening 60 is formed in the center of the bottom of the housing 56. A projecting portion 61 provided on one end of the columnar member 53 is inserted into the opening 60. A first shaft member 55 is disposed outside the housing 56 at the bottom side of the latter. The first shaft member 55 and the housing 56 are integrally connected together through a hollow accommodating portion 62 at one end of the first shaft member 55. The electric motor 54 is accommodated in the accommodating portion 62. A rotating shaft 54a projecting from one end of the electric motor 54 is engaged with a recess 63 provided in the projecting portion 61 of the columnar member 53 non-rotatably relative to the recess 63 to rotate the columnar member 53 forward or reverse directions. On the other hand, a projecting portion 54b on the other end of the electric motor 54 is integral with the motor casing of the electric motor 54 and non-rotatably secured in a recess 64 provided in the bottom of the accommodating portion 62 of the first shaft member 55.

The stabilizer 50 operates as follows. When the first shaft member 55 and the second shaft member 57 are urged to rotate relative to each other in a state as shown in FIG. 16 where a spherical member 10 is positioned in each concave groove portion 42 of each sloped groove 6e (7e), the ball-and-ramp mechanism 3e and the compression spring 51 apply rotational force in a direction for restraining the relative rotation of the first and second shaft members 55 and 57. To increase the restraining rotational force, the electric motor 54 is energized to rotate the columnar member 53 forward, causing the cylindrical member 52 to move toward the ball-and-ramp mechanism 3e, thereby compressing the compression spring 51. As a result of increasing the urging force of the compression spring 51, the ball-and-ramp mechanism 3e generates increased rotational force in the direction for restraining the relative rotation of the first and second shaft members 55 and 57.

Thus, the thrust generator 1e according to the fifth embodiment can be applied to the stabilizer 50.

As has been explained above, according to each embodiment of the present invention, the curvature radii of various regions of each sloped groove, from the starting end region to the terminating end region, are varied from each other so as to be appropriate according to the characteristics of each region in order to enable the wear life to be lengthened as much as possible while meeting the requirements for peeling life (or passage frequency). Therefore, the present invention is not limited to the foregoing embodiments but can be modified in a variety of ways without departing from the spirit of the present invention.

Although in the foregoing embodiments the curvature radii of various regions of each sloped groove, from the starting end region to the terminating end region, each change continuously, the arrangement may be as follows. For example, each region is divided into two subregions, i.e. large and small transmitted force subregions, or into three subregions, i.e. large, medium and small transmitted force subregions. Within each subregion, the curvature radius of the sloped groove is set constant, taking account of the peeling life and the wear life, and the subregions of different curvature radii are smoothly connected together at a border therebetween.

With the thrust generator according to each of the foregoing embodiments, it is possible to improve the durability of the ramp members of the ball-and-ramp mechanism.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2010-222008 filed on Sep. 30, 2010.

The entire disclosure of Japanese Patent Application No. 2010-222008 filed on Sep. 30, 2010 including specification, claims, drawings and summary is incorporated herein by reference in its entirety.

What is claimed is:

1. A thrust generator comprising:
   a pressing member generating thrust in an axial direction; and
   a ball-and-ramp mechanism converting rotational force into rectilinear motion to propel the pressing member;
   the ball-and-ramp mechanism comprising:
   a pair of ramp members each having a plurality of sloped grooves sloped along a circumferential direction, each sloped groove having an arcuate diametrical cross-section; and
   a spherical member interposed between each pair of mutually opposing ones of the sloped grooves of the ramp members to transmit force from one of the pair of ramp members to the other of the pair of ramp members;
   the sloped grooves each having a track area where the spherical member contacts the sloped groove and having regions in the track area that vary in curvature radius of the diametrical cross-section.

2. The thrust generator of claim 1, wherein, in each of the sloped grooves, the curvature radius of the diametrical cross-section is smaller in a region of large transmitted force than in a region of small transmitted force.

3. The thrust generator of claim 2, wherein, in each of the sloped grooves, the curvature radius of the diametrical cross-section decreases at a predetermined rate from the region of small transmitted force toward the region of large transmitted force in the track area where the spherical member wholly or partially contacts the sloped groove.

4. The thrust generator of claim 1, wherein each of the sloped grooves has a first region of the track area and a second region of the track area, and a passage frequency of the spherical member is higher in the second region than the first region, and
   wherein a curvature radius of the diametrical cross-section of each of the sloped grooves is larger in the first region than the second region.

5. The thrust generator of claim 1, wherein each of the sloped grooves has a portion at which a slope angle changes between a region of small transmitted force and a region of large transmitted force in the track area, the portion having a curvature radius smaller than other regions.

6. A disk brake comprising:
   a drive source which outputs rotational force;
   a pressing member generating thrust in an axial direction to press a brake pad against a disk; and
   a ball-and-ramp mechanism converting rotational force transmitted from the drive source into rectilinear motion to propel the pressing member;
   the ball-and-ramp mechanism comprising:
   a pair of ramp members each having a plurality of sloped grooves sloped along a circumferential direction, each sloped groove having an arcuate diametrical cross-section; and
   a rolling member interposed between each pair of mutually opposing ones of the sloped grooves of the ramp members to transmit force from one of the pair of ramp members to the other of the pair of ramp members;
   the sloped grooves each having a track area where the rolling member contacts the sloped groove and having regions in the track area that vary in curvature radius of the diametrical cross-section.

7. The disk brake of claim 6, wherein, in each of the sloped grooves, the curvature radius of the diametrical cross-section is smaller in a region of large transmitted force than in a region of small transmitted force.

8. The disk brake of claim 7, wherein, in each of the sloped grooves, the curvature radius of the diametrical cross-section decreases at a predetermined rate from the region of small transmitted force toward the region of large transmitted force in the track area where the spherical member wholly or partially contacts the sloped groove.

9. The disk brake of claim 6, wherein each of the sloped grooves has a first region of the track area and a second region of the track area, and a passage frequency of the spherical member is higher in the second region than the first region, and wherein a curvature radius of the diametrical cross-section of each of the sloped grooves is larger in the first region than the second region.

10. The disk brake of claim 6, wherein each of the sloped grooves has a portion at which a slope angle changes between a region of small transmitted force and a region of large transmitted force in the track area, the portion having a curvature radius smaller than other regions.

11. The disk brake of claim 6, wherein each of the sloped grooves changes in configuration from a region of small transmitted force to a region of large transmitted force along the track area where the rolling member interposed between the ramp members contacts the sloped groove, and wherein, when the rotational force is transmitted from the drive source to the ball-and-ramp mechanism, rotation of the one ramp member causes the rolling member to move from the region of small transmitted force to the region of large transmitted force, and a passage frequency at which the rolling member passes the track area of the sloped groove in response to the rotation of the one ramp member is higher in the region of small transmitted force than in the region of large transmitted force.

12. The disk brake of claim 6, wherein the drive source is an electric motor.

13. The disk brake of claim 12, wherein the electric motor is driven in accordance with an operation of a brake pedal of a vehicle.

14. The disk brake of claim 13, wherein the electric motor is driven in accordance with an operation of a parking brake operating member of the vehicle.

15. The thrust generator of claim 1, wherein each of the sloped grooves extends in a circumferential direction from a first end to a second end, and the sloped groove is shallower at the second end than the first end, and wherein a curvature radius of the diametrical cross-section of each of the sloped grooves is larger at the first end than at the second end.

16. The thrust generator of claim 1, wherein each of the sloped grooves extends in a circumferential direction from a first end to a second end, and the sloped groove is shallower at the second end than the first end, and wherein a curvature radius of the diametrical cross-section of each of the sloped grooves becomes progressively smaller from the first end to the second end.

17. The thrust generator of claim 1, wherein each of the sloped grooves extends in a circumferential direction from a first end to a second end, and the sloped groove is shallower at the second end than the first end, and wherein an area of contact of each of the sloped grooves with the spherical member is smaller at the first end than at the second end.

18. The thrust generator of claim 1, wherein each of the sloped grooves extends in a circumferential direction from a first end to a second end, and the sloped groove is shallower at the second end than the first end, and wherein an area of contact of each of the sloped grooves with the spherical member becomes progressively larger from the first end to the second.

* * * * *